United States Patent
Ma

(10) Patent No.: US 8,572,725 B2
(45) Date of Patent: Oct. 29, 2013

(54) DYNAMIC PASSWORD STRENGTH DEPENDENT ON SYSTEM STATE

(75) Inventor: Jason Szecheong Ma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/072,243

(22) Filed: Mar. 25, 2011

(65) Prior Publication Data
US 2012/0246714 A1    Sep. 27, 2012

(51) Int. Cl.
*G06F 7/04*    (2006.01)

(52) U.S. Cl.
USPC .......................................................... 726/16

(58) Field of Classification Search
None
See application file for complete search history.

(56) References Cited

U.S. PATENT DOCUMENTS

| | | | |
|---|---|---|---|
| 2009/0259588 A1* | 10/2009 | Lindsay | 705/40 |
| 2010/0024028 A1* | 1/2010 | Baugher et al. | 726/17 |
| 2010/0146602 A1 | 6/2010 | Delia et al. | |

OTHER PUBLICATIONS

Hongyuan Chen and Sivakumar, T.V.L.N., New Authentication Method for Mobile Centric Communications, IEEE 61st Vehicular Technology Conference—VTC 2005—Spring Stockholm: Paving the Path for a Wireless Future, published on Jun. 1, 2005.

* cited by examiner

*Primary Examiner* — Brandon Hoffman
(74) *Attorney, Agent, or Firm* — Van Leeuwen & Van Leeuwen; Matthew W. Baca

(57) ABSTRACT

An approach is provided by detecting password entries by a user of a system with each of the password entries corresponding to a password entered when invoking a password enabled application on the system. A password strength is calculated corresponding to each of the detected password entries. A strongest password is identified based on the password strength calculations. A device lock request is received from the user of the system, with the device lock request being received at a user interface, such as a GUI control. The system is set into a locked state. The locked state prevents data stored on the information handling system from being accessed while the information handling system is in the locked state. The system is subsequently unlocked by entry of the identified strongest password by the user.

25 Claims, 6 Drawing Sheets

DYNAMIC PASSWORD STRENGTH DEPENDENT ON SYSTEM STATE

BACKGROUND

The present invention relates to an approach that provides stronger device unlock passwords based upon the applications currently running on the device.

Devices typically provide for a single unlock password regardless of the sensitivity of applications currently running on the devices and that would be visible when the device is unlocked irrespective of the strength of the passwords that were used to open the applications before the device was locked. Types of devices include mobile pervasive computing devices, such as handheld telephones, as well as traditional computer systems such as desktop and laptop computer systems.

BRIEF SUMMARY

According to one disclosed embodiment, an approach is provided by detecting one or more password entries by a user of an information handling system with each of the password entries corresponding to a password entered when invoking a password enabled application on the information handling system. A password strength is calculated corresponding to each of the detected password entries. The calculation is performed by one or more processors. A strongest password is identified based on the password strength calculations. A device lock request is received from the user of the information handling system, with the device lock request being received at a user interface, such as a GUI control. The information handling system is set into a locked state. The locked state prevents data stored on the information handling system from being accessed while the information handling system is in the locked state. The system is subsequently unlocked by entry of the identified strongest password by the user.

According to another disclosed embodiment, an approach is provided by scanning a display screen when a selected application executing on an information handling system is invoked, with the information handling system executing more than one application. A password entry field is identified as being displayed by the selected application. A plurality of keystrokes directed at the identified password entry field are captured, the captured keystrokes forming a password entry that corresponds to the selected application. A password strength of the password entry is calculated. The password entry and the password strength are stored in a memory area that includes a each of password entries and calculated password strengths corresponding to a multiple password enabled applications The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein.

DETAILED DESCRIPTION

Figure 1:
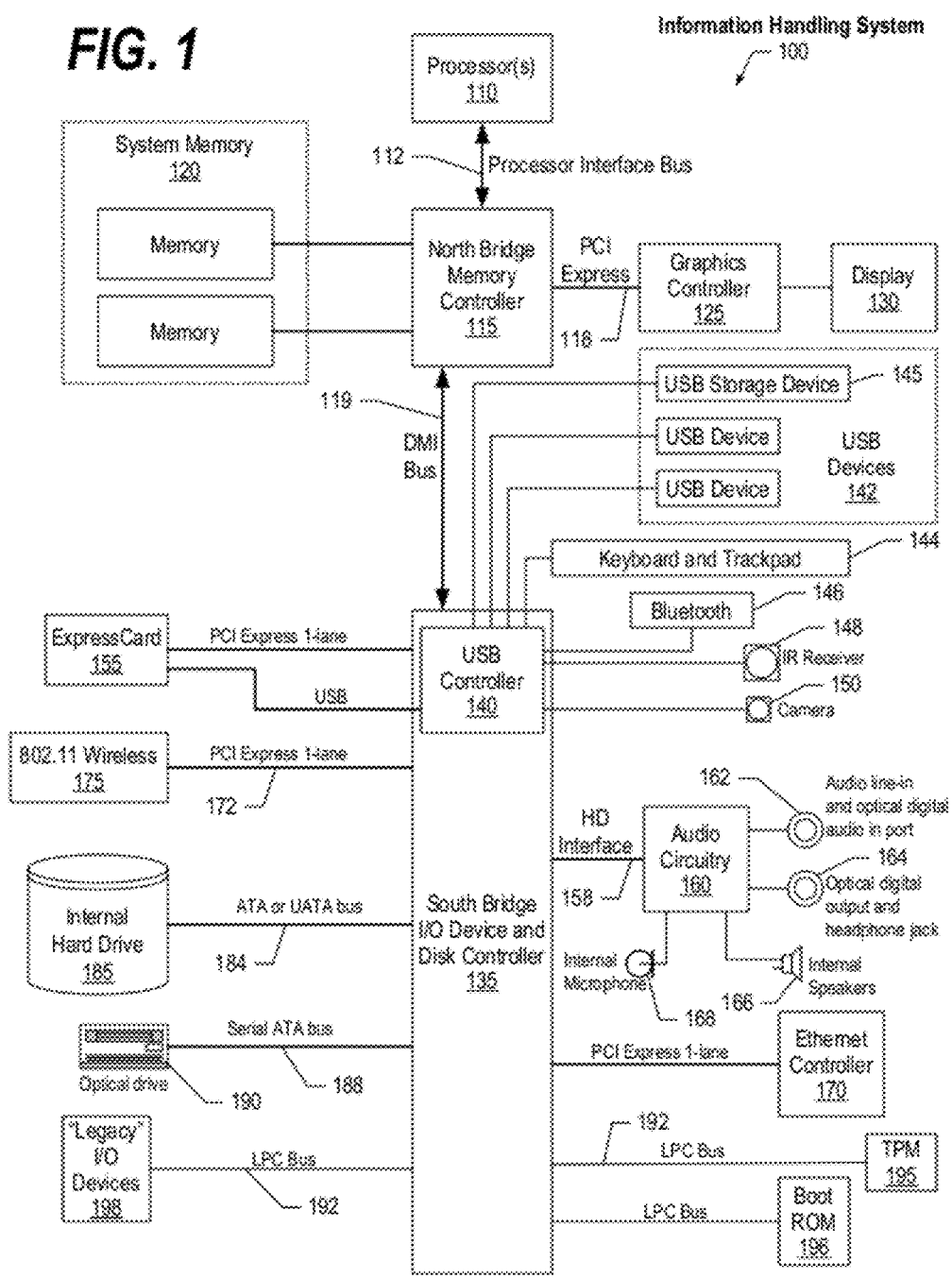
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
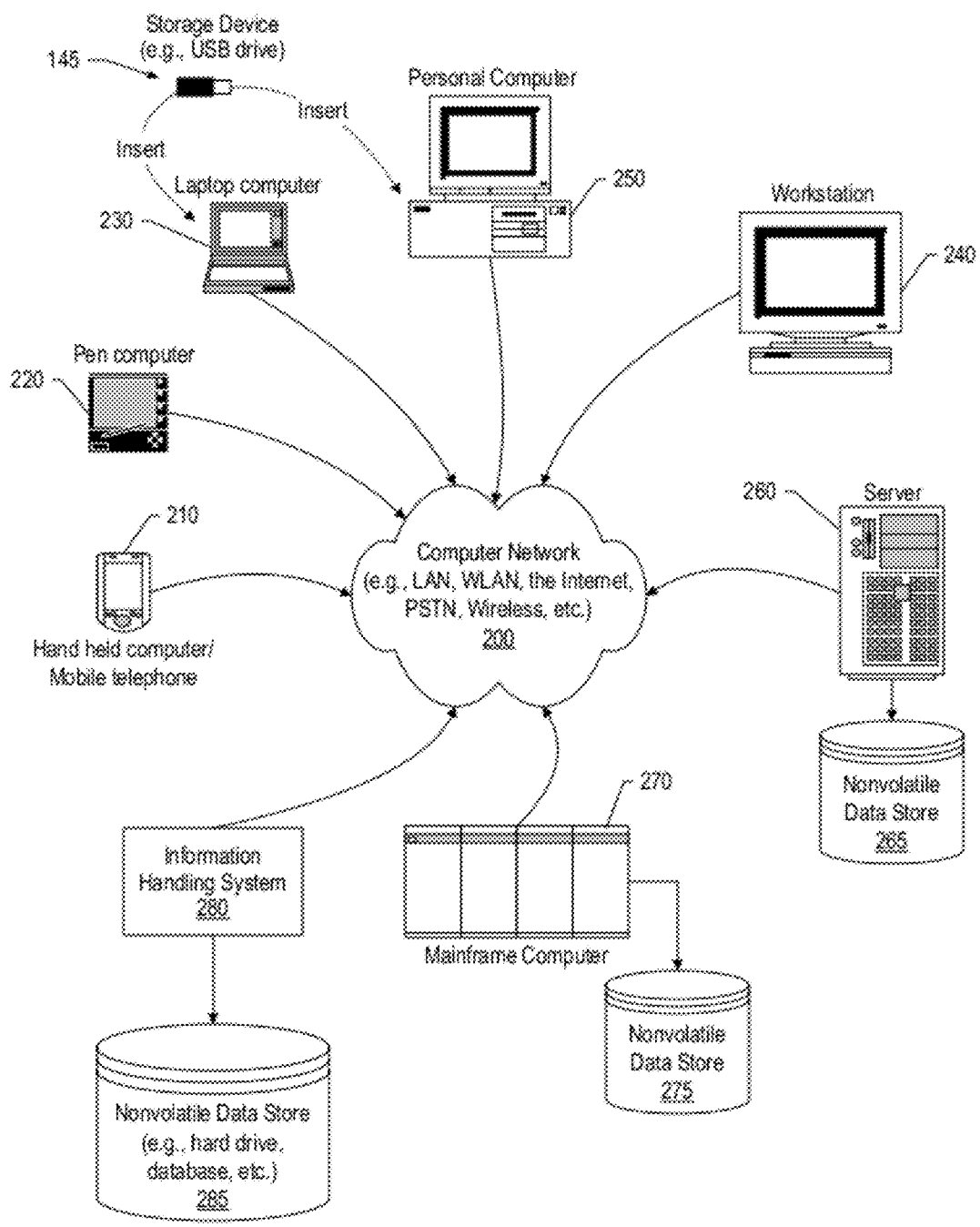
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280.

As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
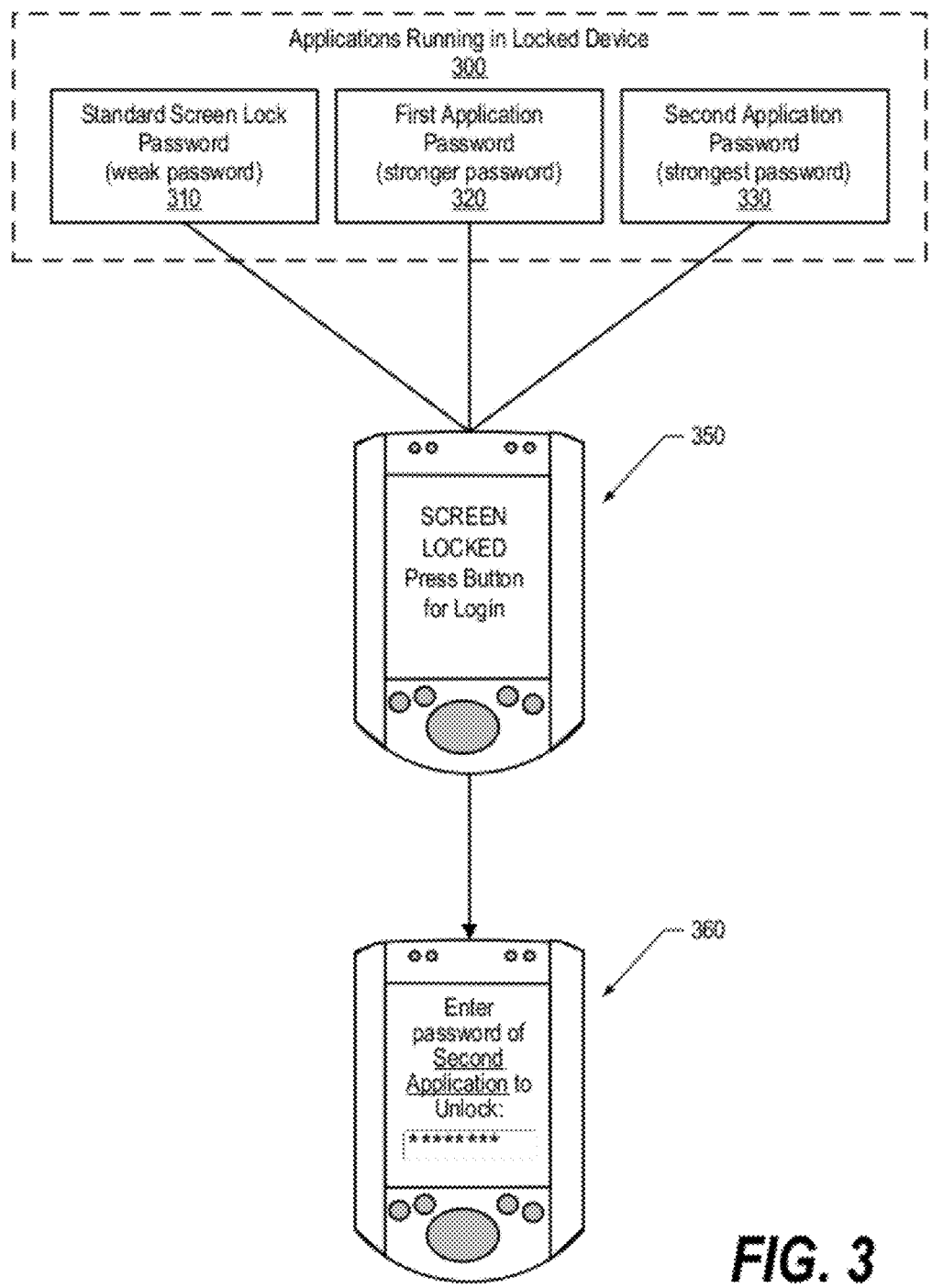
FIG. 3 is a diagram depicting various applications with various passwords currently running on a locked device.

FIG. 3 is a diagram depicting various applications with various passwords currently running on a locked device. Applications space 300 depicts various applications running in a device which is an information handling system such as a mobile telephone, mobile/notebook computer system, personal digital assistant (PDA), desktop computer system, any of the system types shown in FIG. 2, or any information handling system being a machine with a display and a processor capable of executing the methods depicted in FIGS. 4, 5, and 6.

Application space 300 is shown with three password-enabled applications currently running in the information handling system—the standard screen lock application (310), a first application program (320), and a second application program (330). A password-enabled application may be an application stored on a nonvolatile storage device of the information handling system or a network-accessible application that resides on a network computer system that is accessed by the information handling system via a computer network, such as the Internet. These password-enabled applications require a password to use the application. Applications that provide the user with access to confidential or sensitive information are often password-enabled.

The device can be set into a locked state (view 350) in order to prevent someone that gains physical access to the device from viewing data available on the device without entering a password. If application programs (e.g., application programs 320 and 330) are currently being executed on the information handling system, then the password that is used to unlock the system is the password with the highest strength, as opposed to the standard screen lock password. When the user requests to unlock the information handling system (view 360), the display prompts the user to enter the strongest password corresponding to one of the applications currently running on the system. In the example shown, the password corresponding to the second application (330) is the strongest, so in view 360, the user is being prompted to enter the password that corresponds to the second application, rather than being prompted to enter the standard screen unlock password. Of course, if no password-enabled applications are currently running on the information handling system, then the user would be prompted to enter the standard screen lock password. Upon entry of the requested (strongest) password, the information handling system enters an unlocked state allowing the user to use and otherwise access data stored on the information handling system.

Figure 4:
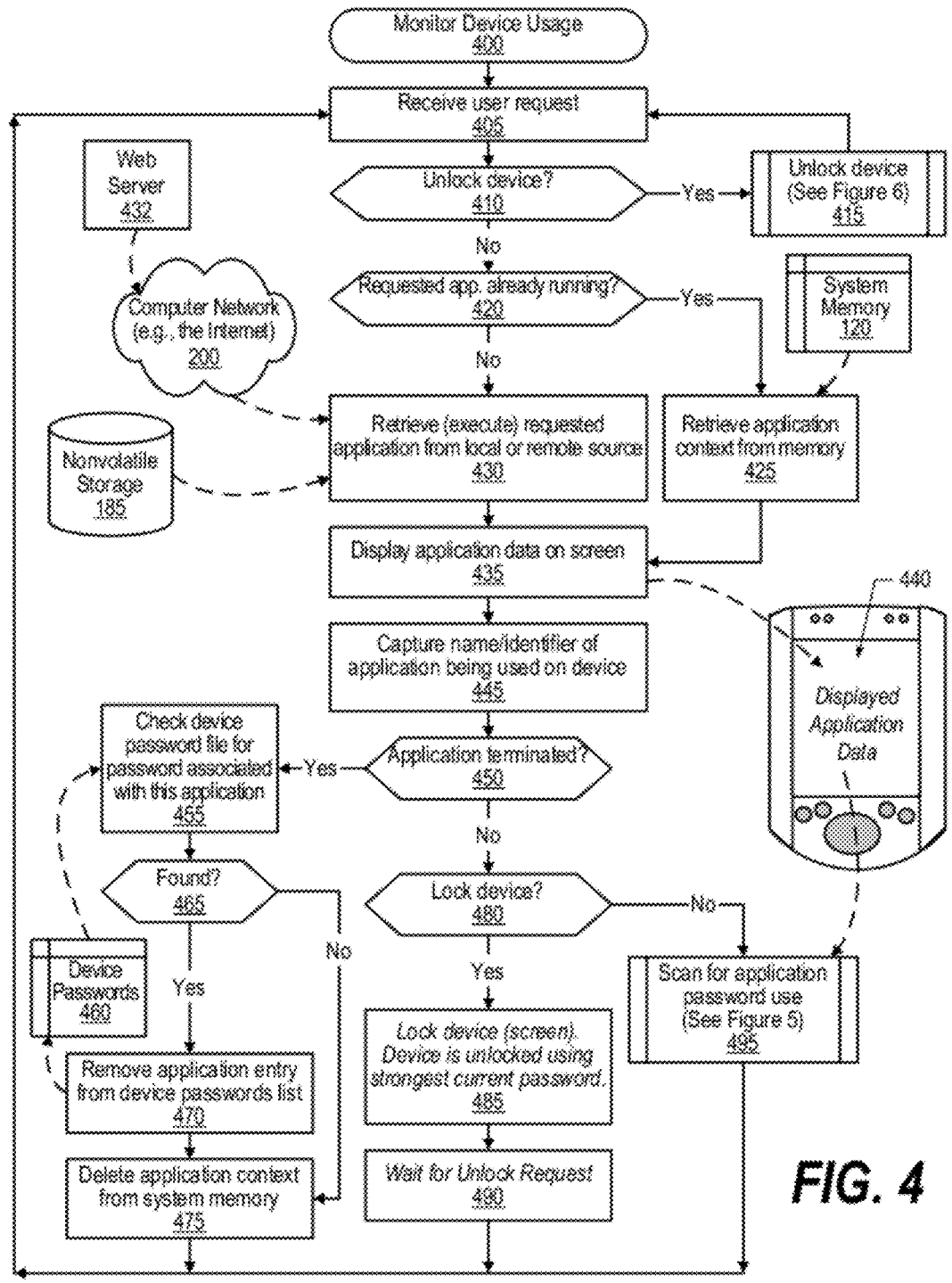
FIG. 4 is a flowchart showing steps used to monitor usage of a device with emphasis on password usage and device locking and unlocking.

FIG. 4 is a flowchart showing steps used to monitor usage of a device with emphasis on password usage and device locking and unlocking. Processing commences at 400 whereupon, at step 405, a request is received from a user of an information handling system. A decision is made as to whether the request is an unlock device request to unlock the information handling system after it has been set into a locked state (decision 410). If the user request is an unlock device request, then decision 410 branches to the "yes" branch whereupon, at step 415, handling of the unlock device request is performed (see FIG. 6 and corresponding text for processing details), after which processing loops back to receive and process the next user request.

On the other hand, if the request is not an unlock device request, then decision 410 branches to the "no" branch whereupon a decision is made as to whether the user request corresponds to an application program that is currently running on the information handling system (decision 420). If the request corresponds to an application program currently running on the information handling system, then decision 420 branches to the "yes" branch whereupon, at step 425, the context of the requested application is retrieved from system memory 120. On the other hand, if the request corresponds to an application program that is not currently running on the information handling system, then decision 420 branches to the "no" branch whereupon, at step 430, the information handling system retrieves and executes the requested application. The requested application can be a local application that is retrieved from local memory, such as nonvolatile data store 185, or can be a network application received from web server 432 via computer network 200, such as the Internet.

At step 435, application data corresponding to the requested application is displayed on a display screen that is accessible from (or included in) the information handling system, such as display 440. At step 445, an application identifier corresponding to the requested application is captured. In one embodiment, the application identifier is the name of the application.

A decision is made as to whether the application is being terminated (e.g., closed by the user, etc.) at decision 450. If the application is being terminated, then decision 450 branches to the "yes" branch whereupon, at step 455, the application identifier of the program is matched against one or more application identifiers stored in a current device passwords memory area 460. A decision is made as to whether a match was found (decision 465), indicating that the application being terminated is a password-enabled application. If a match was found, then decision 465 branches to the "yes" branch whereupon, at step 470, the entry in the device passwords memory area 460 that corresponds with the terminated application is removed. The entry includes the application identifier, the application's password used when the user first invoked the application, and the password strength which is a value calculated by analyzing the application's password. In one embodiment, the application identifier, application password, and password strength value are associated with one another by being in the same entry (record) that is stored in the device passwords memory area 460. In addition, in one embodiment, device passwords memory area 460 is an encrypted memory area. Returning to decision 465, if the matching of the application identifier with application identifiers stored in device passwords memory area 460 was unsuccessful (indicating that the application being terminated is not a password-enabled application), then decision 465 branches to the "no" branch bypassing step 470. At step 475, the terminated applications context is deleted from system memory 120. Processing then loops back to receive and process the next user request.

If the application is not being terminated, then decision 450 branches to the "no" branch whereupon a decision is made as to whether the user is requesting to lock the information handling system device (decision 480). If the user request is to lock the information handling system device, then decision 480 branches to the "yes" branch whereupon, at step 485, the information handling system is set into a locked state whereupon, as explained in FIG. 6, the information handling system is unlocked by receiving the password of the application with the strongest password that is currently running on the information handling system. At step 490, the device waits for the user to enter an unlock device request (e.g., by pressing a particular key, etc. on the device). When the unlock device request is received, then processing loops back to process the request using the logic shown in FIG. 6.

Figure 5:
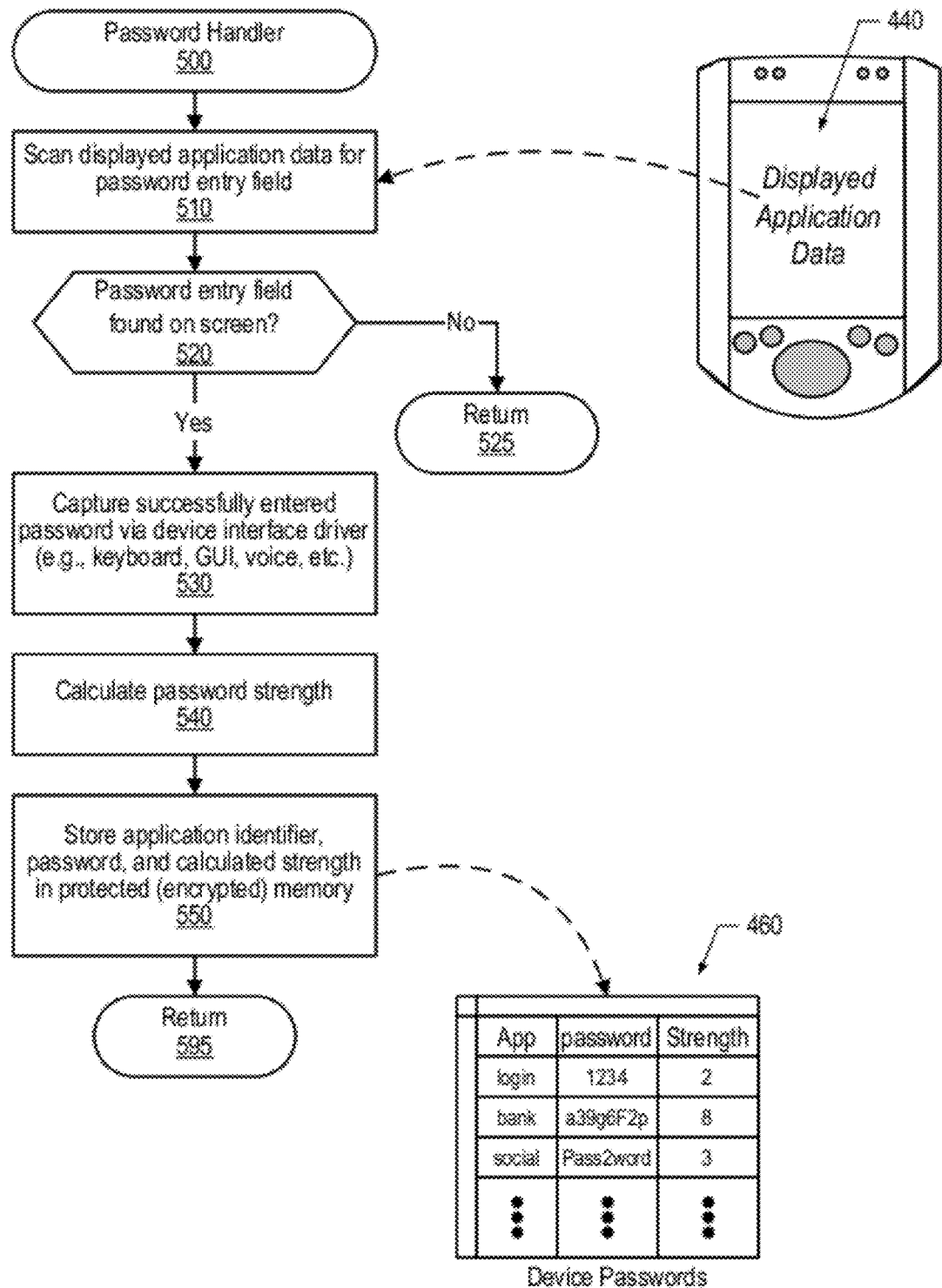
FIG. 5 is a flowchart showing steps used to handle passwords entered at the device.

Returning to decision 480, if the user request is not a lock device request, then decision 480 branches to the "no" branch whereupon, at predefined process 485, the display screen of the information handling system is scanned for password usage associated with the application (see FIG. 5 and corresponding text for processing details). Processing then loops back to receive and process the next user request.

FIG. 5 is a flowchart showing steps used to handle passwords entered at the device. Processing commences at 500 whereupon, at step 510, the system scans display screen 440 for a password entry field included in the displayed application data. A decision is made as to whether a password entry screen was found on the display screen (decision 520). If no password entry field was found on the display screen, then decision 520 branches to the "no" branch whereupon processing returns to the calling routine (see FIG. 4) at 525.

On the other hand, if a password entry field was found on the display screen, then decision 520 branches to the "yes" branch whereupon, at step 530, the system captures a successfully entered password using a device driver, such as a keyboard device driver, that captures the keystrokes entered at the information handling system. At step 540 any one of many password strength algorithms is used to calculate a password strength score corresponding to the password entered by the user. For example, the password strength might be increased when the password is longer, is not a common word from a dictionary, includes both letters and numbers, includes both uppercase and lowercase letters, includes special (non-alphanumeric) characters, and the like. Various password strength algorithms that score a password's strength based on the above factors, and other factors, are known the those skilled in the art. At step 550, an entry is made in device passwords memory area 460. The entry includes the captured application password, the strength of the password, and the application identifier (e.g., application name, etc.) corresponding to the password. In this embodiment, these elements (password, strength, and application identifier) are associated with one another by including each of the elements in a single entry, or record, that is stored in memory area 460. After the password data is stored, processing returns to the calling routine (see FIG. 4) at 595.

Figure 6:
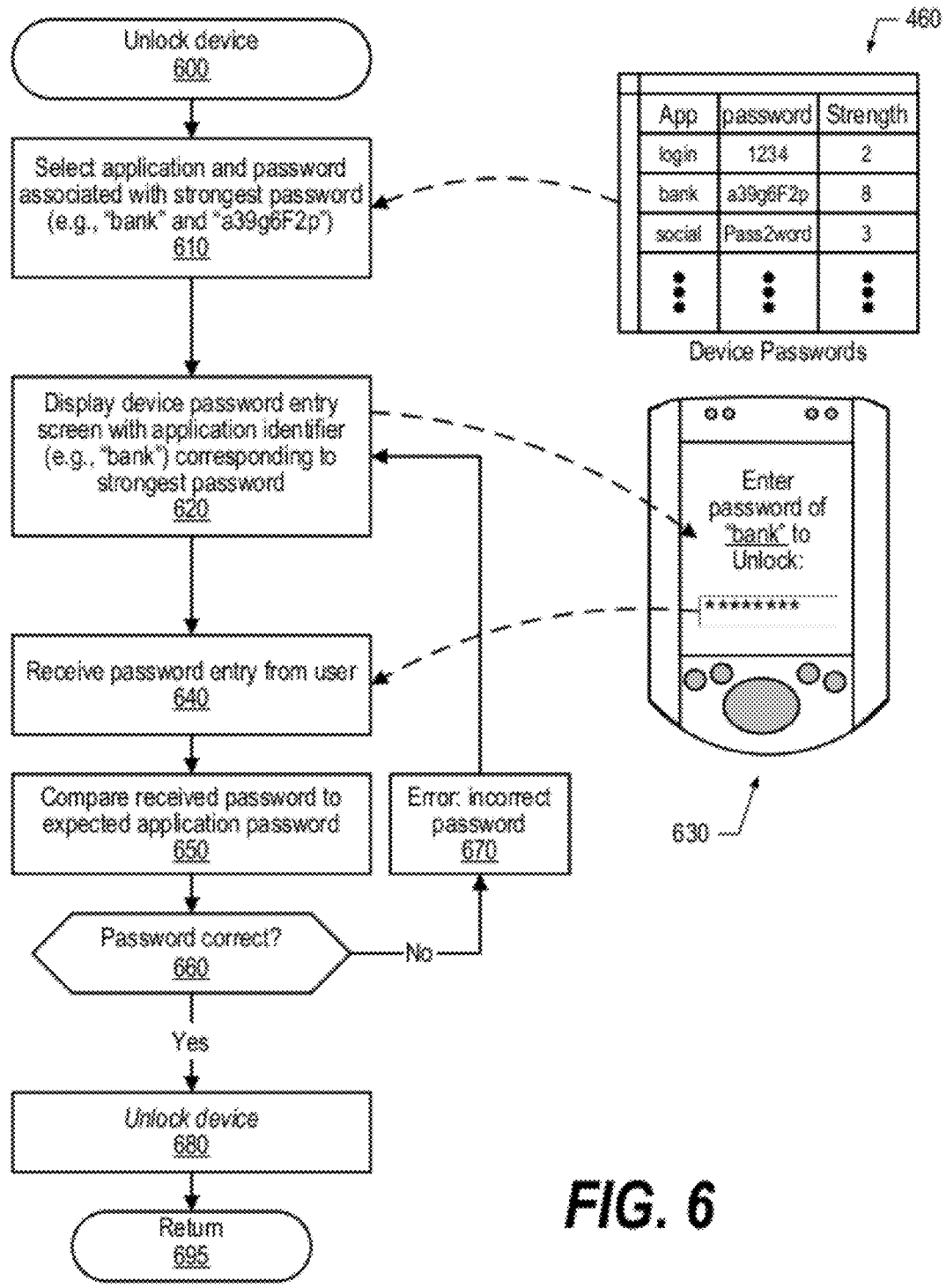
FIG. 6 is a flowchart showing steps used when the user requests to unlock the device when password-oriented applications are currently running on the device.

FIG. 6 is a flowchart showing steps used when the user requests to unlock the device when password-oriented applications are currently running on the device. Processing commences at 600 after the user has requested to unlock the information handling system (device). At step 610, the strongest password is selected from device passwords memory area 460 by analyzing the password strength element associated with each of the passwords. In the example shown, the password with the greatest strength has a value of '8' and corresponds to a bank application (application identifier="bank").

At step 620, password entry screen display 630 is displayed to the user on the display screen accessible from or included with the information handling system. The password entry screen notifies the user of which password needs to be entered to unlock the information handling system. In the example shown, the user is being asked to enter the password of the "bank" application to unlock the device.

At step 640, a password entry is received from the user (e.g., by entering the requested password in the password entry field, etc.). At step 650, the password received from the user is compared to the password associated with the application identifier displayed in the prompt (in this case, the "bank" application password). A decision is made as to whether the password entered by the user matches the expected password that is associated with the application identifier (decision 660). If the password is incorrect, then decision 660 branches to the "no" branch whereupon, at step 670, an error is reported that the user entered an incorrect password, and processing loops back to step 620 to display the password entry screen and receive another password entry from the user. On the other hand, if the password entered by the user is correct, then decision 660 branches to the "yes" branch whereupon, at step 680, the information handling system device is unlocked allowing the user to use the device and access data stored on the device. Processing then returns to the calling routine (see FIG. 4) at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method that is implemented by an information handling system, the method comprising:
    detecting a plurality of password entries by a user of the information handling system, wherein each of the password entries corresponds to one of a plurality of passwords entered at an input device of the information handling system when invoking an application on the information handling system;
    calculating a password strength corresponding to each of the detected password entries, the calculating performed by one or more processors;
    identifying a strongest password based on the password strength calculations;
    receiving a device lock request from the user of the information handling system, the device lock request received at a user interface; and
    setting the information handling system into a locked state, wherein the locking prevents data stored on the information handling system from being accessed while the information handling system is in the locked state, and wherein the information handling system is unlocked by entry of the identified strongest password.

2. The method of claim 1 further comprising:
    recording an application identifier corresponding to the application associated with the identified strongest password;
    after setting the information handling system into the locked state, receiving a subsequent unlock device request at the information handling system;
    displaying the application identifier on a display screen accessible from the information handling system, wherein the displaying requests user entry of the password associated with the application identifier;
    receiving an unlock password at the information handling system from the user;
    comparing the received unlock password to the strongest password;
    setting the information handling system into an unlocked state in response to the received unlock password matching the strongest password; and
    maintaining the locked state of the information handling system in response to the received unlock password being different than the strongest password.

3. The method of claim 1 further comprising:
    scanning a display screen when a selected one of the applications is invoked, wherein the detection of the password entries is performed during by the scanning identifying a password entry field;
    capturing a plurality of keystrokes directed at the identified password entry field, the captured keystrokes forming the password entry that corresponds to the selected application;
    calculating the password strength of the password entry; and
    storing the password entry and the password strength in a memory area that includes the one or more password entries and the calculated password strength corresponding to each of the stored password entries.

4. The method of claim 3 wherein the memory area is an encrypted memory area.

5. The method of claim 3 further comprising:
    identifying an application identifier corresponding to the selected application;
    storing the application identifier in the memory area; and
    associating the application identifier with the stored password entry and the stored password strength in the memory area.

6. The method of claim 5 further comprising:
    detecting a termination of one of the applications running on the information handling system, the terminated application corresponding to a terminated application identifier;
    matching the terminated application identifier with the one or more application identifiers stored in the memory area; and
    removing the matching application identifier and the associated password entry and the password strength from the memory area in response to a successful match.

7. The method of claim 5 further comprising:
after setting the information handling system into the locked state, receiving a subsequent unlock device request at the information handling system;
identifying the strongest password based on the password strength associated with each of the password entries stored in the memory area;
retrieving, from the memory area, the application identifier corresponding to the identified strongest password;
displaying the retrieved application identifier on the display screen, wherein the displaying requests user entry of the password associated with the displayed application identifier;
receiving an unlock password at the information handling system from the user;
comparing the received unlock password to the strongest password;
setting the information handling system into an unlocked state in response to the received unlock password matching the strongest password; and
maintaining the locked state of the information handling system in response to the received unlock password being different than the strongest password.

8. An information handling system comprising:
one or more processors;
a memory coupled to at least one of the processors, wherein the memory includes a plurality of memory areas;
a display screen accessible by at least one of the processors; and
a set of computer program instructions stored in the memory and executed by at least one of the processors in order to perform actions of:
detecting a plurality of password entries by a user of the information handling system, wherein each of the password entries corresponds to one of a plurality of passwords entered at an input device of the information handling system when invoking an application on the information handling system;
calculating a password strength corresponding to each of the detected password entries, the calculating performed by one or more processors;
identifying a strongest password based on the password strength calculations;
receiving a device lock request from the user of the information handling system, the device lock request received at a user interface; and
setting the information handling system into a locked state, wherein the locking prevents data stored on the information handling system from being accessed while the information handling system is in the locked state, and wherein the information handling system is unlocked by entry of the identified strongest password.

9. The information handling system of claim 8 wherein the processors perform additional actions comprising:
recording an application identifier corresponding to the application associated with the identified strongest password;
after setting the information handling system into the locked state, receiving a subsequent unlock device request at the information handling system;
displaying the application identifier on the display screen, wherein the displaying requests user entry of the password associated with the application identifier;
receiving an unlock password at the information handling system from the user;
comparing the received unlock password to the strongest password;
setting the information handling system into an unlocked state in response to the received unlock password matching the strongest password; and
maintaining the locked state of the information handling system in response to the received unlock password being different than the strongest password.

10. The information handling system of claim 8 wherein the processors perform additional actions comprising:
scanning the display screen when a selected one of the applications is invoked, wherein the detection of the password entries is performed during by the scanning identifying a password entry field;
capturing a plurality of keystrokes directed at the identified password entry field, the captured keystrokes forming the password entry that corresponds to the selected application;
calculating the password strength of the password entry; and
storing the password entry and the password strength in a memory area that includes the one or more password entries and the calculated password strength corresponding to each of the stored password entries.

11. The information handling system of claim 10 wherein the memory area is an encrypted memory area.

12. The information handling system of claim 10 wherein the processors perform additional actions comprising:
identifying an application identifier corresponding to the selected application;
storing the application identifier in the memory area; and
associating the application identifier with the stored password entry and the stored password strength in the memory area.

13. The information handling system of claim 12 wherein the processors perform additional actions comprising:
detecting a termination of one of the applications running on the information handling system, the terminated application corresponding to a terminated application identifier;
matching the terminated application identifier with the one or more application identifiers stored in the memory area; and
removing the matching application identifier and the associated password entry and the password strength from the memory area in response to a successful match.

14. The information handling system of claim 12 wherein the processors perform additional actions comprising:
after setting the information handling system into the locked state, receiving a subsequent unlock device request at the information handling system;
identifying the strongest password based on the password strength associated with each of the password entries stored in the memory area;
retrieving, from the memory area, the application identifier corresponding to the identified strongest password;
displaying the retrieved application identifier on the display screen, wherein the displaying requests user entry of the password associated with the application identifier;
receiving an unlock password at the information handling system from the user;
comparing the received unlock password to the strongest password;
setting the information handling system into an unlocked state in response to the received unlock password matching the strongest password; and maintaining the locked state of the information handling system in response to the received unlock password being different than the strongest password.

15. A computer program product stored in a computer readable storage device, comprising computer program code that, when executed by an information handling system, causes the information handling system to perform actions comprising:
    detecting a plurality of password entries by a user of the information handling system, wherein each of the password entries corresponds to one of a plurality of passwords entered at an input device of the information handling system when invoking an application on the information handling system;
    calculating a password strength corresponding to each of the detected password entries, the calculating performed by one or more processors;
    identifying a strongest password based on the password strength calculations;
    receiving a device lock request from the user of the information handling system, the device lock request received at a user interface; and
    setting the information handling system into a locked state, wherein the locking prevents data stored on the information handling system from being accessed while the information handling system is in the locked state, and wherein the information handling system is unlocked by entry of the identified strongest password.

16. The computer program product of claim 15 wherein the information handling system performs further actions comprising:
    recording an application identifier corresponding to the application associated with the identified strongest password;
    after setting the information handling system into the locked state, receiving a subsequent unlock device request at the information handling system;
    displaying the application identifier on a display screen accessible from the information handling system, wherein the displaying requests user entry of the password associated with the application identifier;
    receiving an unlock password at the information handling system from the user;
    comparing the received unlock password to the strongest password;
    setting the information handling system into an unlocked state in response to the received unlock password matching the strongest password; and
    maintaining the locked state of the information handling system in response to the received unlock password being different than the strongest password.

17. The computer program product of claim 15 wherein the information handling system performs further actions comprising:
    scanning a display screen when a selected one of the applications is invoked, wherein the detection of the password entries is performed during by the scanning identifying a password entry field;
    capturing a plurality of keystrokes directed at the identified password entry field, the captured keystrokes forming the password entry that corresponds to the selected application;
    calculating the password strength of the password entry; and
    storing the password entry and the password strength in a memory area that includes the one or more password entries and the calculated password strength corresponding to each of the stored password entries.

18. The computer program product of claim 17 wherein the memory area is an encrypted memory area.

19. The computer program product of claim 17 wherein the information handling system performs further actions comprising:
    identifying an application identifier corresponding to the selected application;
    storing the application identifier in the memory area; and
    associating the application identifier with the stored password entry and the stored password strength in the memory area.

20. The computer program product of claim 19 wherein the information handling system performs further actions comprising:
    detecting a termination of one of the applications running on the information handling system, the terminated application corresponding to a terminated application identifier;
    matching the terminated application identifier with the one or more application identifiers stored in the memory area; and
    removing the matching application identifier and the associated password entry and the password strength from the memory area in response to a successful match.

21. The computer program product of claim 19 wherein the information handling system performs further actions comprising:
    after setting the information handling system into the locked state, receiving a subsequent unlock device request at the information handling system;
    identifying the strongest password based on the password strength associated with each of the password entries stored in the memory area;
    retrieving, from the memory area, the application identifier corresponding to the identified strongest password;
    displaying the retrieved application identifier on the display screen, wherein the displaying requests user entry of the password associated with the application identifier;
    receiving an unlock password at the information handling system from the user;
    comparing the received unlock password to the strongest password;
    setting the information handling system into an unlocked state in response to the received unlock password matching the strongest password; and
    maintaining the locked state of the information handling system in response to the received unlock password being different than the strongest password.

22. A method that is implemented by an information handling system, the method comprising:
    scanning a display screen when a selected application executing on an information handling system is invoked, wherein the information handling system executes a plurality of applications;
    identifying a password entry field being displayed by the selected application;
    capturing a plurality of keystrokes directed at the identified password entry field, the captured keystrokes forming a password entry that corresponds to the selected application;
    calculating a password strength of the password entry; and
    storing the password entry and the password strength in a memory area that includes a plurality of password entries and a plurality of calculated password strengths corresponding to a plurality of password enabled applications.

23. The method of claim 22 further comprising:
identifying an application identifier corresponding to the selected application;
storing the application identifier in the memory area; and
associating the application identifier with the stored password entry and the stored password strength in the memory area.

24. The method of claim 23 further comprising:
detecting a termination of one of the applications running on the information handling system, the terminated application corresponding to a terminated application identifier;
matching the terminated application identifier with the one or more application identifiers stored in the memory area; and
removing the matching application identifier and the associated password entry and the password strength from the memory area in response to a successful match.

25. The method of claim 23 further comprising:
setting the information handling system into the locked state in response to a user request;
receiving a subsequent unlock device request at the information handling system;
identifying a strongest password based on the password strength associated with each of the password entries stored in the memory area;
retrieving, from the memory area, the application identifier corresponding to the identified strongest password;
displaying the retrieved application identifier on the display screen, wherein the displaying requests user entry of the password associated with the displayed application identifier;
receiving an unlock password at the information handling system from the user;
comparing the received unlock password to the strongest password;
setting the information handling system into an unlocked state in response to the received unlock password matching the strongest password; and
maintaining the locked state of the information handling system in response to the received unlock password being different than the strongest password.

* * * * *